United States Patent
Fujita et al.

(10) Patent No.: US 9,997,295 B2
(45) Date of Patent: Jun. 12, 2018

(54) ELECTRONIC COMPONENT

(71) Applicant: Murata Manufacturing Co., Ltd., Nagaokakyo-shi, Kyoto-fu (JP)

(72) Inventors: Yukihiro Fujita, Nagaokakyo (JP); Tadateru Yamada, Nagaokakyo (JP); Hirobumi Adachi, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 74 days.

(21) Appl. No.: 14/851,114

(22) Filed: Sep. 11, 2015

(65) Prior Publication Data

US 2016/0093439 A1   Mar. 31, 2016

(30) Foreign Application Priority Data

Sep. 26, 2014 (JP) ................................. 2014-196730
May 11, 2015 (JP) ................................. 2015-096426

(51) Int. Cl.
*H01G 4/005* (2006.01)
*H01G 4/228* (2006.01)
(Continued)

(52) U.S. Cl.
CPC .............. *H01G 4/228* (2013.01); *H01G 2/06* (2013.01); *H01G 4/005* (2013.01); *H01G 4/30* (2013.01)

(58) Field of Classification Search
CPC .. H01G 4/30; H01G 4/38; H01G 4/12; H01G 4/228; H01G 4/248; H01G 4/008
See application file for complete search history.

(56) References Cited

U.S. PATENT DOCUMENTS 6,381,117 B1 * 4/2002 Nakagawa ............... H01G 2/14
361/301.4
6,418,007 B1 * 7/2002 Lacy ..................... H01G 4/255
361/301.1
(Continued)

FOREIGN PATENT DOCUMENTS

CN            103299382 A       9/2013
CN            104064355 A       9/2014
(Continued)

OTHER PUBLICATIONS

Official Communication issued in Chinese Patent Application No. 201510613619.4, dated Mar. 14, 2018.

*Primary Examiner* — Nguyen Ha
(74) *Attorney, Agent, or Firm* — Keating & Bennett, LLP

(57) ABSTRACT

An electronic component includes an electronic element including two outer electrodes on surfaces thereof and a board terminal including a board main body and two mounting electrodes. The board main body has electrical insulating properties and a first principal surface. The two mounting electrodes are disposed on the first principal surface and electrically coupled to the two outer electrodes, respectively. The electronic element is mounted on the first principal surface side. The two outer electrodes are partially disposed outside an outer edge of the board terminal when viewed from the first principal surface side. The height from an end of each of the two outer electrodes opposite the board terminal to an end of the board terminal opposite the electronic element is not greater than a larger dimension of the width of the electronic element and the width of the board terminal.

20 Claims, 15 Drawing Sheets

(51) Int. Cl.
*H01G 2/06* (2006.01)
*H01G 4/30* (2006.01)

(56) References Cited

U.S. PATENT DOCUMENTS

| | | | | |
|---|---|---|---|---|
| 8,125,764 B2* | 2/2012 | Ishida | ............... | H01G 2/24 361/306.1 |
| 2004/0066589 A1* | 4/2004 | Togashi | ............... | H01G 2/065 361/15 |
| 2004/0183147 A1* | 9/2004 | Togashi | ............... | H01G 2/065 257/414 |
| 2004/0240146 A1* | 12/2004 | Kayatani | ............... | H01G 2/103 361/306.3 |
| 2008/0055859 A1* | 3/2008 | Furukawa | ............... | H01C 1/148 361/704 |
| 2008/0118721 A1* | 5/2008 | Horie | ............... | H01C 1/148 428/209 |
| 2008/0123248 A1* | 5/2008 | Kunishi | ............... | C25D 3/12 361/306.3 |
| 2013/0033836 A1 | 2/2013 | Hattori et al. | | |
| 2013/0037911 A1 | 2/2013 | Hattori et al. | | |
| 2013/0056252 A1 | 3/2013 | Fujii et al. | | |
| 2013/0057112 A1* | 3/2013 | Shirakawa | ............... | H01C 1/148 310/311 |
| 2013/0329389 A1 | 12/2013 | Hattori et al. | | |
| 2014/0016242 A1* | 1/2014 | Hattori | ............... | H01G 2/06 361/303 |
| 2014/0063687 A1* | 3/2014 | Saito | ............... | H01G 4/228 361/308.1 |
| 2014/0116768 A1 | 5/2014 | Hattori et al. | | |
| 2014/0124256 A1 | 5/2014 | Hattori et al. | | |
| 2014/0268486 A1 | 9/2014 | Hattori et al. | | |
| 2014/0268487 A1 | 9/2014 | Yoshida | | |
| 2014/0284089 A1 | 9/2014 | Hattori et al. | | |

FOREIGN PATENT DOCUMENTS

| | | |
|---|---|---|
| JP | 2004-134430 A | 4/2004 |
| JP | 2012-204572 A | 10/2012 |
| JP | 2013-038144 A | 2/2013 |
| JP | 2013-038291 A | 2/2013 |
| JP | 2013-065820 A | 4/2013 |
| JP | 2013-258240 A | 12/2013 |
| JP | 2014-086606 A | 5/2014 |
| JP | 2014-179456 A | 9/2014 |
| JP | 2014-179512 A | 9/2014 |
| JP | 2014-179583 A | 9/2014 |
| WO | 2012/090986 A1 | 7/2012 |
| WO | 2013/008549 A1 | 1/2013 |
| WO | 2013/008550 A1 | 1/2013 |

* cited by examiner

ELECTRONIC COMPONENT

BACKGROUND OF THE INVENTION

1. Field of the Invention

The present invention relates to electronic components and, in particular, to an electronic component including an electronic element with electrostrictive characteristics.

2. Description of the Related Art

One example of a document that discloses a mounting structure of a multilayer capacitor that aims to reduce noise called "acoustic noise" is Japanese Unexamined Patent Application Publication No. 2013-65820. In the mounting structure of the multilayer capacitor described in Japanese Unexamined Patent Application Publication No. 2013-65820, lands are disposed on a board main body and connected to respective outer electrodes by soldering. The distance from each of the land electrodes to the top of the solder is not larger than about 1.27 times the distance from the land electrode to an exposed portion where a capacitor conductor nearest the circuit board is exposed through an end surface.

In the mounting structure of the multilayer capacitor described in Japanese Unexamined Patent Application Publication No. 2013-65820, vibrations propagating from the multilayer capacitor through the solder fillet to the circuit board, and thus acoustic noise are reduced by locating the capacitor conductor (conductive layer) nearest the circuit board away from the circuit board. In this structure, the multilayer capacitor has a large height to maintain its electrostatic capacity. If the dimension of the height of the electronic component, such as the multilayer capacitor, is larger than the dimension of the width of the electronic component, the position of the electronic component is unstable when it is mounted on the circuit board.

SUMMARY OF THE INVENTION

In the light of the above problems, preferred embodiments of the present invention provide an electronic component that is able to be mounted in a stable position while significantly reducing or preventing acoustic noise.

According to a preferred embodiment of the present invention, an electronic component includes an electronic element including two outer electrodes on a surface thereof, and a board terminal including a board main body and two mounting electrodes. The board main body has electrical insulating properties and includes a first principal surface. The two mounting electrodes are disposed on the first principal surface, are spaced apart from each other in a length direction, and are electrically coupled to the two outer electrodes, respectively. The electronic element is mounted on the first principal surface. The two outer electrodes are partially disposed outside an outer edge of the board terminal when viewed from a height direction. A dimension in a height direction of the electronic element is not greater than a larger one of a dimension in a width direction of the electronic element and a dimension in the width direction of the board terminal. The height direction is perpendicular or substantially perpendicular to the first principal surface, and the width direction is perpendicular or substantially perpendicular to the length direction and the height direction.

According to a preferred embodiment of the present invention, the electronic element may further include a multilayer body in which a plurality of dielectric layers and a plurality of conductive layers are laminated. The plurality of conductive layers may include first inner electrodes connecting one of the two outer electrodes and second inner electrodes connecting the other one of the two outer electrodes. The multilayer body may include an effective portion in which the first inner electrodes and the second inner electrodes overlap one another with the dielectric layer disposed therebetween, and an ineffective portion surrounding the effective portion. A dimension in the height direction of the board main body may be larger than a dimension in the height direction of a portion of the ineffective portion between the board terminal and the effective portion.

According to a preferred embodiment of the present invention, the dimension in the width direction of the board terminal may be smaller than the dimension in the width direction of the electronic element.

According to a preferred embodiment of the present invention, a dimension in the length direction of the board terminal may be smaller than a dimension in the length direction of the electronic element.

According to a preferred embodiment of the present invention, the two mounting electrodes may fully overlap the effective portion when viewed from the height direction.

According to a preferred embodiment of the present invention, a shortest distance between the two mounting electrodes may be not greater than the shortest distance between the two outer electrodes.

According to a preferred embodiment of the present invention, a dimension in the height direction of the electronic element may be smaller than the dimension in the width direction of the electronic element.

According to a preferred embodiment of the present invention, each of a pair of side surfaces in each of the two mounting electrodes may be at least partially covered with a conductive film joining the two outer electrodes and the two mounting electrodes.

According to a preferred embodiment of the present invention, the electronic element may be a capacitor element.

According to a preferred embodiment of the present invention, the capacitor element may include two outer electrodes.

According to a preferred embodiment of the present invention, the capacitor element may include a plurality of dielectric layers and a plurality of conductive layers alternately laminated in a lamination direction.

According to a preferred embodiment of the present invention, the lamination direction may be perpendicular or substantially perpendicular to a length direction of the capacitor element.

According to a preferred embodiment of the present invention, the capacitor element may include a multilayer body including an effective portion and an ineffective portion.

According to a preferred embodiment of the present invention, the effective portion may define and function as a capacitor and the ineffective portion may not define or function as a capacitor.

According to a preferred embodiment of the present invention, the effective portion may include conductive layers overlapping dielectric layers such that a first one of the conductive layers connected to one of the two outer electrodes and a second one of the conductive layers connected to the other of the two outer electrodes are laminated with one of the dielectric layers disposed therebetween.

According to a preferred embodiment of the present invention, a direction connecting the two outer electrodes with a shortest distance may be parallel or substantially parallel to a length direction of the capacitor element.

According to a preferred embodiment of the present invention, at least one of the two outer electrodes may include a conductive paste underlying layer and a plating layer that covers the underlying layer.

According to a preferred embodiment of the present invention, the plating layer may include a plurality of plating layers made of different materials.

According to a preferred embodiment of the present invention, the board terminal may include indentations on both ends in a length direction of the board main body.

According to a preferred embodiment of the present invention, the indentations may have a shape that is one of elliptical, semi-elliptical and polygonal.

According to various preferred embodiments of the present invention, the electronic component is able to be mounted in a stable position while significantly reducing or preventing acoustic noise.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
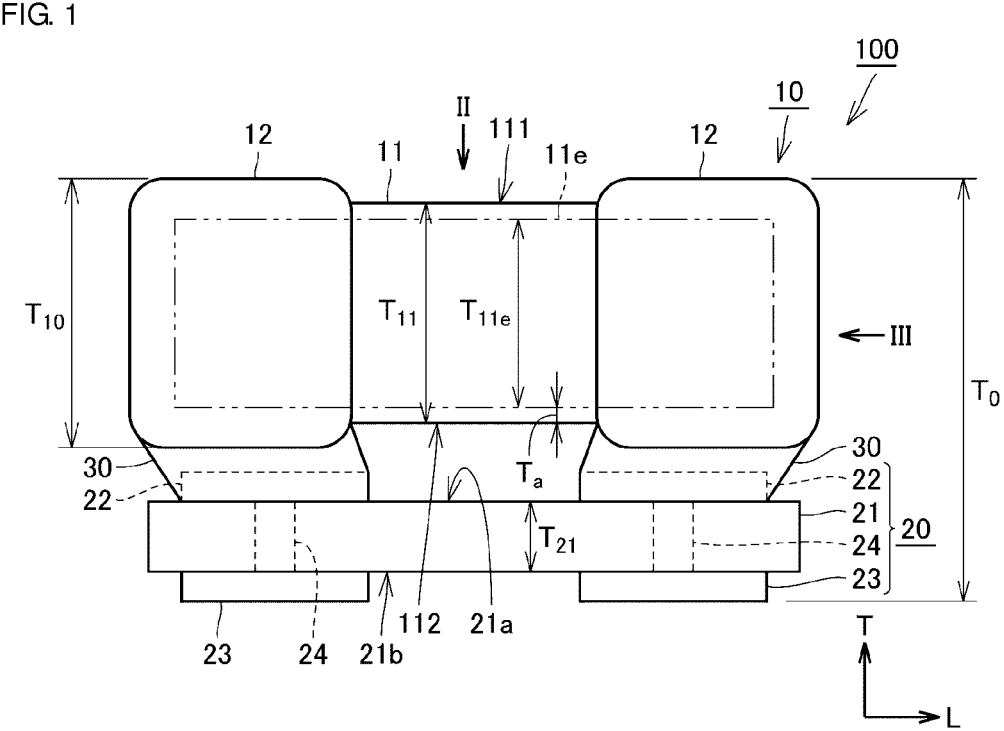
FIG. 1 is a front view that illustrates a configuration of an electronic component according to a first preferred embodiment of the present invention.

Electronic components according to preferred embodiments of the present invention are described below with reference to the drawings. In the description of the preferred embodiments below, the same reference numerals are used in the same or corresponding portions in the drawings, and the description thereof is not repeated. In the description of the preferred embodiments below, an electronic component including a capacitor element as an electronic element is described. The electronic element is not limited to the capacitor element, and it may be an inductor element, a thermistor element, a piezoelectric element, or a semiconductor element.

First Preferred Embodiment

Figure 2:
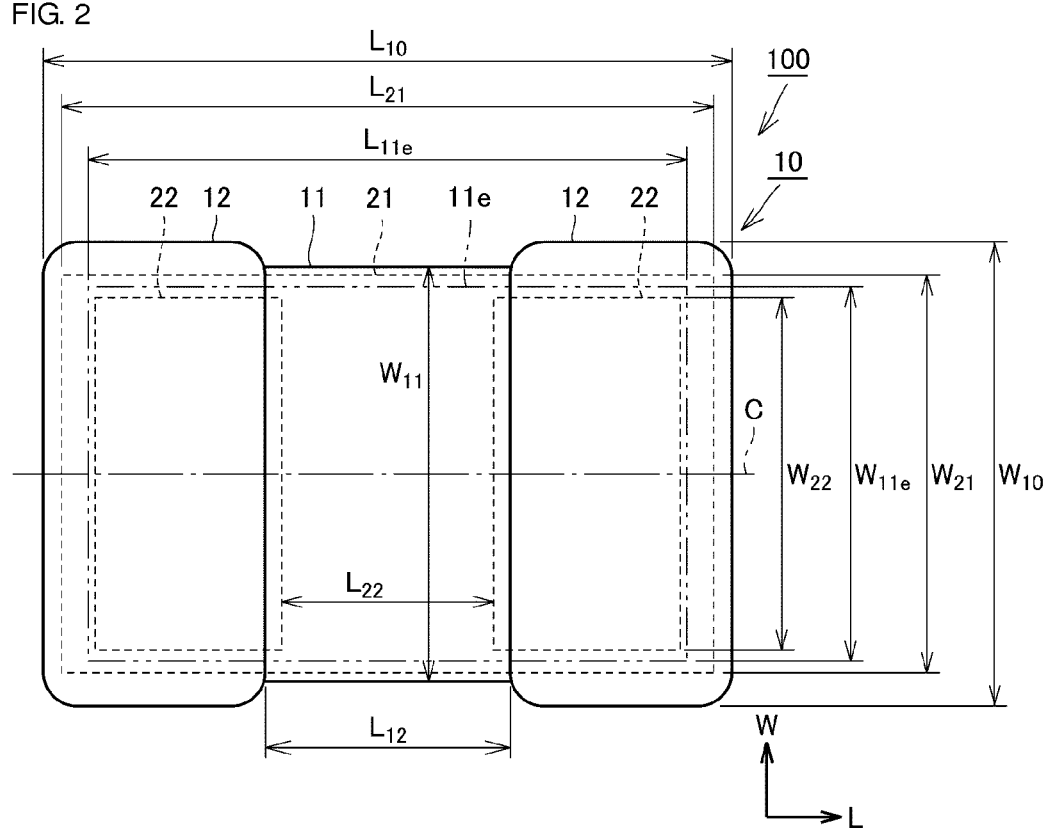
FIG. 2 is a plan view of the electronic component illustrated in FIG. 1 viewed from the direction of the arrow II.
Figure 3:
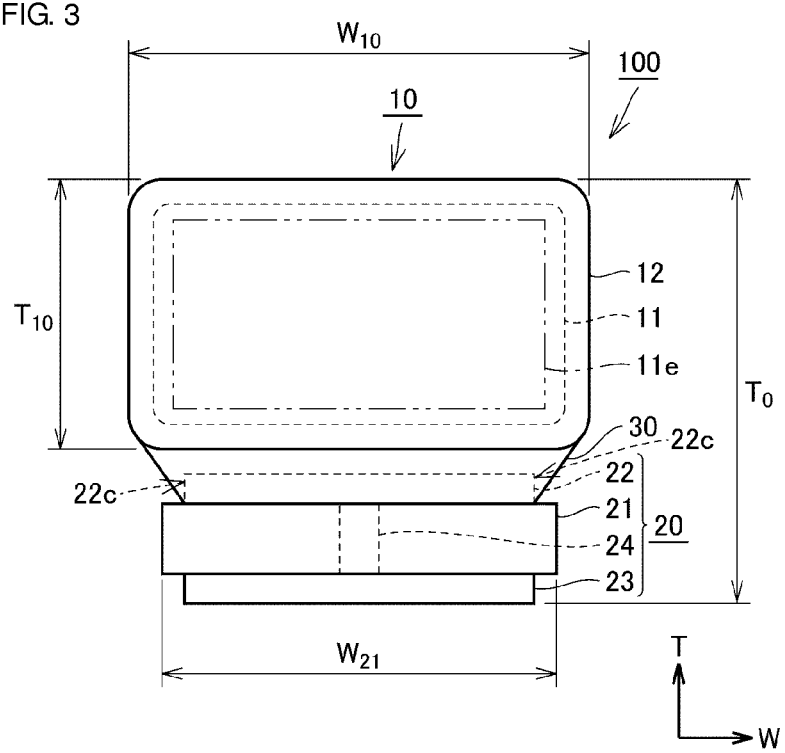
FIG. 3 is a side view of the electronic component illustrated in FIG. 1 viewed from the direction of the arrow III.
Figure 4:
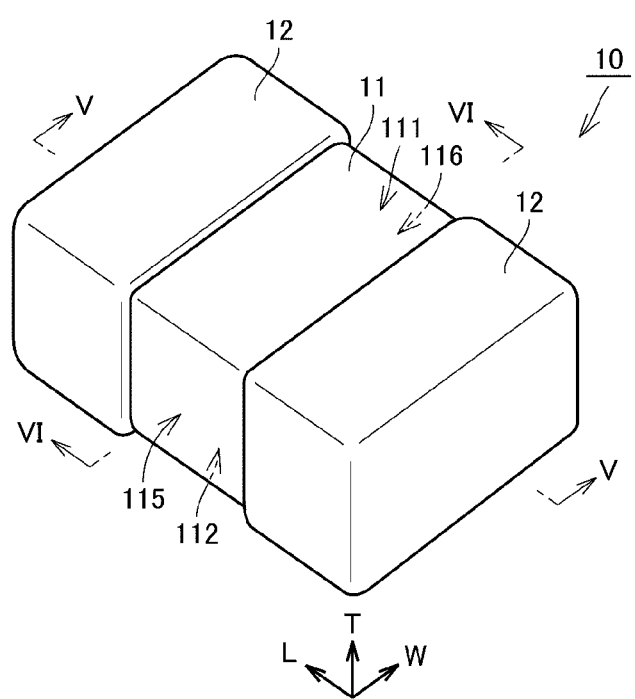
FIG. 4 is a perspective view that illustrates an outward appearance of a capacitor element included in the electronic component according to the first preferred embodiment of the present invention.
Figure 5:
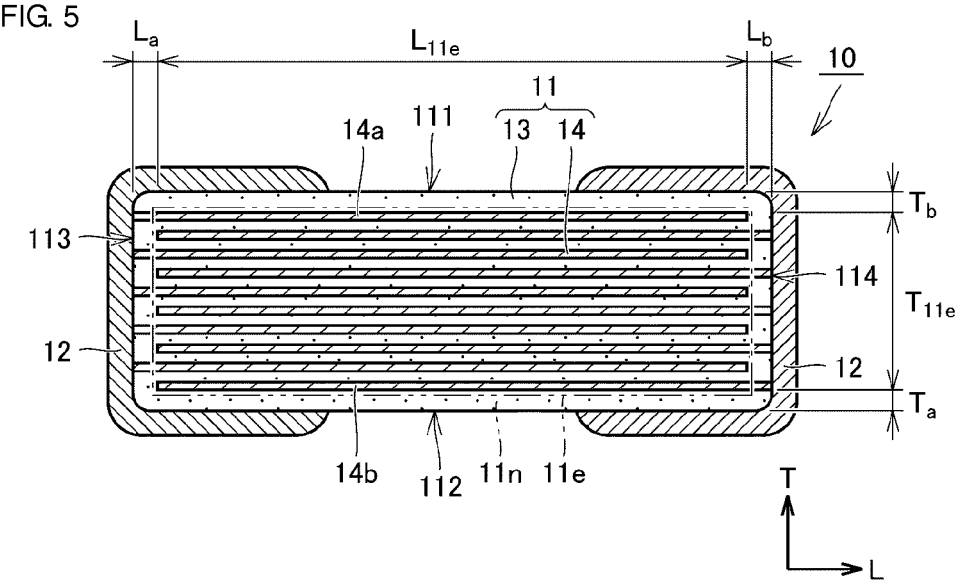
FIG. 5 is a cross-sectional view of the capacitor element illustrated in FIG. 4 viewed from the direction of the line V-V with the arrows.
Figure 6:
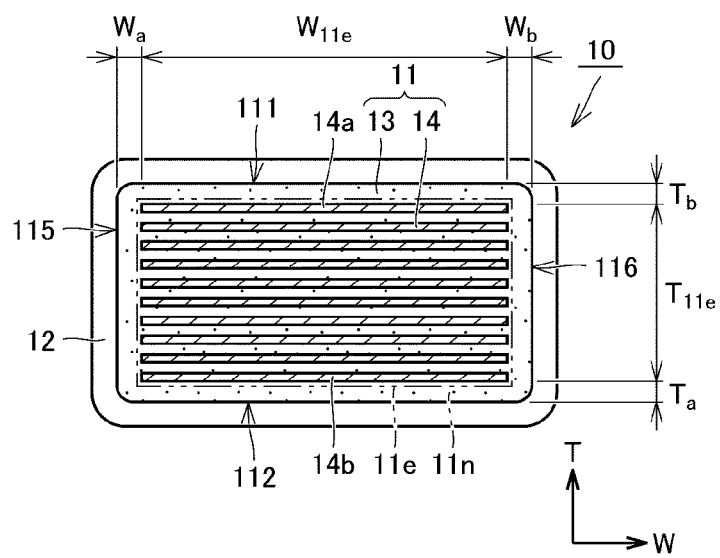
FIG. 6 is a cross-sectional view of the capacitor element illustrated in FIG. 4 viewed from the direction of the line VI-VI with the arrows.
Figure 7:
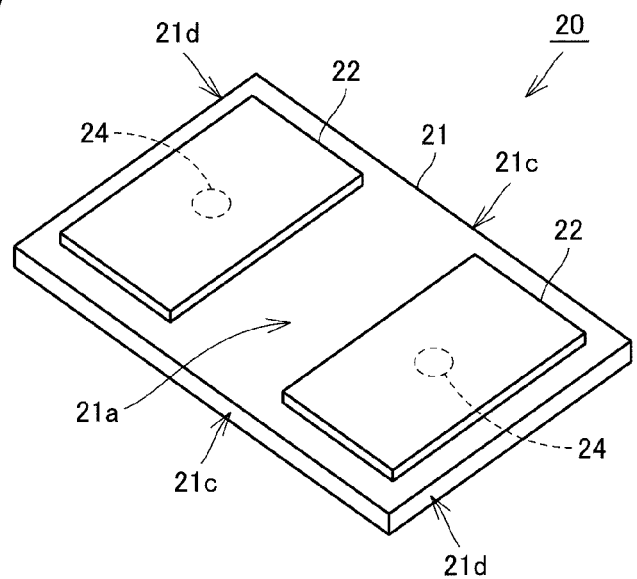
FIG. 7 is a perspective view of a board terminal included in the electronic component according to the first preferred embodiment of the present invention viewed from the side of a principal surface.
Figure 8:
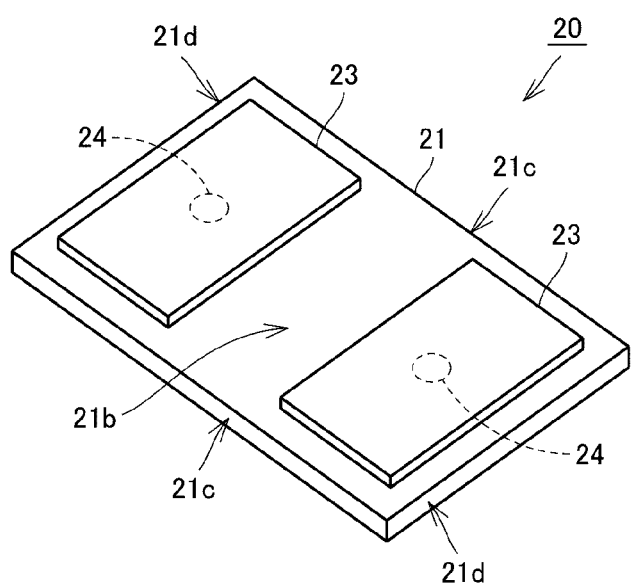
FIG. 8 is a perspective view of the board terminal included in the electronic component according to the first preferred embodiment of the present invention viewed from the side of another principal surface.

FIG. 1 is a front view that illustrates a configuration of an electronic component according to a first preferred embodiment of the present invention. FIG. 2 is a plan view of the electronic component illustrated in FIG. 1 viewed from the direction of the arrow II. FIG. 3 is a side view of the electronic component illustrated in FIG. 1 viewed from the direction of the arrow III. FIG. 4 is a perspective view that illustrates an outward appearance of a capacitor element included in the electronic component according to the first preferred embodiment of the present invention. FIG. 5 is a cross-sectional view of the capacitor element illustrated in FIG. 4 viewed from the direction of the line V-V with the arrows. FIG. 6 is a cross-sectional view of the capacitor element illustrated in FIG. 4 viewed from the direction of the line VI-VI with the arrows. FIG. 7 is a perspective view of a board terminal included in the electronic component according to the first preferred embodiment of the present invention viewed from the side of a principal surface. FIG. 8 is a perspective view of the board terminal included in the electronic component according to the first preferred embodiment of the present invention viewed from the side of another principal surface.

In FIGS. 1 to 6, a length direction L of a capacitor element 10, a width direction W of the capacitor element 10, and a height direction T of the capacitor element 10 are illustrated. In FIG. 2, a center line C of the capacitor element 10 is illustrated, and the center line C passes through substantially the center of the capacitor element 10 in the width direction W of the capacitor element 10 and extends along the length direction L of the capacitor element 10.

As illustrated in FIGS. 1 to 8, an electronic component 100 according to the first preferred embodiment of the present invention includes the capacitor element 10 and a board terminal 20. The capacitor element 10 is an electronic element and includes at least two outer electrodes 12 on its surfaces. The board terminal 20 includes a first principal surface 21a. The capacitor element 10 is mounted near the first principal surface 21a, or on the first principal surface 21a side. In the present preferred embodiment, the capacitor element 10 includes the two outer electrodes 12.

As illustrated in FIGS. 5 and 6, the capacitor element 10 included in the electronic component according to the first preferred embodiment of the present invention includes a multilayer body 11 and the two outer electrodes 12 disposed on the multilayer body 11. The multilayer body 11 is configured such that a plurality of dielectric layers 13 and a plurality of flat conductive layers 14 are alternately laminated. The outer electrodes 12 are situated on the surfaces in both end portions in the length direction L of the capacitor element 10.

Of the conductive layers 14 being next to and opposed to each other, one conductive layer 14 is electrically coupled to the outer electrode 12 on one end in the length direction L of the capacitor element 10 and the other conductive layer 14 is electrically coupled to the outer electrode 12 on another end in the length direction L of the capacitor element 10. In other words, the conductive layers 14 include first inner electrodes connecting one of the two outer electrodes 12 and second inner electrodes connecting the other one of the two outer electrodes 12.

In the present preferred embodiment, all of the conductive layers 14 are electrically coupled to either one of the two outer electrodes 12, but not all of the plurality of conductive layers 14 may be electrically connected thereto. At least some of the plurality of conductive layers 14 are necessary to be electrically coupled to either one of the two outer electrodes 12. That is, the plurality of conductive layers 14 may include one or more conductive layers 14 electrically coupled to neither of the two outer electrodes 12.

In the capacitor element 10 according to the present preferred embodiment, the lamination direction of the dielectric layers 13 and the conductive layers 14 is perpendicular or substantially perpendicular to the length direction L of the capacitor element 10 and the width direction W of the capacitor element 10. That is, the lamination direction of the dielectric layers 13 and the conductive layers 14 is parallel or substantially parallel to the height direction T of the capacitor element 10.

The multilayer body 11 includes a first principal surface 111 and a second principal surface 112. The first principal surface 111 and the second principal surface 112 are situated on the opposite sides in the lamination direction. The multilayer body 11 further includes a first end surface 113, a second end surface 114, a first side surface 115, and a second side surface 116. The first end surface 113 and the second end surface 114 connect the first principal surface 111 and the second principal surface 112 and are situated on the opposite sides in the multilayer body 11. The first side surface 115 and the second side surface 116 connect the first principal surface 111 and the second principal surface 112, also connect the first end surface 113 and the second end surface 114, and are situated on the opposite sides in the multilayer body 11. The multilayer body 11 preferably has a rectangular or substantially rectangular parallelepiped outer shape, and may be rounded in at least one of corner portions and ridge portions.

As illustrated in FIGS. 1 and 2, the dimension of the width of the multilayer body 11 in the width direction W of the capacitor element 10 is $W_{11}$, and the dimension of the height of the multilayer body 11 in the height direction T of the capacitor element 10 is $T_{11}$.

As illustrated in FIGS. 1 to 3, 5, and 6, the multilayer body 11 includes an effective portion 11e and an ineffective portion 11n surrounding the effective portion 11e. The effective portion 11e is a portion where the conductive layers 14 and the dielectric layers 13 overlap one another such that the conductive layer 14 connected to one of the two outer electrodes 12 and the conductive layer 14 connected to the other of the two outer electrodes 12 are laminated with the dielectric layer 13 disposed therebetween. In other words, the effective portion 11e is a portion where the first inner electrodes and the second inner electrodes overlap one another with the dielectric layer 13 disposed therebetween.

Specifically, the effective portion 11e in the multilayer body 11 is a region where portions defining and functioning as a capacitor are laminated, each of the portions including the conductive layer 14 electrically coupled to the outer electrode 12 on one end in the length direction L of the capacitor element 10, the conductive layer 14 electrically coupled to the outer electrode 12 on another end in the length direction L of the capacitor element 10, and the dielectric layer 13 disposed between these two conductive layers 14.

In the present preferred embodiment, the effective portion 11e in the multilayer body 11 is an overlapping area of all of the plurality of conductive layers 14, which include a first conductive layer 14a nearest the first principal surface 111, a second conductive layer 14b nearest the second principal surface 112, and conductive layers 14 disposed therebetween, when viewed in the height direction T of the capacitor element 10.

As illustrated in FIGS. 1, 2, 5, and 6, the dimension of the length of the effective portion 11e in the multilayer body 11 in the length direction L of the capacitor element 10 is $L_{11e}$, the dimension of the width of the effective portion 11e in the multilayer body 11 in the width direction W of the capacitor element 10 is $W_{11e}$, and the dimension of the height of the effective portion 11e in the multilayer body 11 in the height direction T of the capacitor element 10 is $T_{11e}$.

The ineffective portion 11n in the multilayer body 11 is a portion outside the effective portion 11e in the multilayer body 11 and is a region that does not function as a capacitor.

As illustrated in FIGS. 1, 2, 5, and 6, in the length direction L of the capacitor element 10, the dimension of the length of the ineffective portion 11n near the first end surface 113 is $L_a$, and the dimension of the length of the ineffective portion 11n near the second end surface 114 is $L_b$. In the width direction W of the capacitor element 10, the dimension of the width of the ineffective portion 11n near the first side surface 115 is $W_a$, and the dimension of the width of the ineffective portion 11n near the second side surface 116 is $W_b$. In the height direction T of the capacitor element 10, the dimension of the height of the ineffective portion 11n near the first principal surface 111 is $T_b$, and the dimension of the height of the ineffective portion 11n near the second principal surface 112 is $T_a$.

The direction connecting the two outer electrodes 12 with the shortest distance is parallel or substantially parallel to the length direction L of the capacitor element 10. The shortest distance between the two outer electrodes 12 in a portion on the second principal surface 112, which faces the board terminal 20, in the multilayer body 11 is $L_{12}$.

As a material of each of the plurality of dielectric layers 13, a dielectric ceramic material having barium titanate ($BaTiO_3$), calcium titanate ($CaTiO_3$), strontium titanate ($SrTiO_3$), calcium ziroconate ($CaZrO_3$), or the like as the main ingredient may be used. A dielectric ceramic material in which an accessory ingredient, such as a manganese compound, a magnesium compound, a silicon compound, a cobalt compound, a nickel compound, or a rear earth compound, is added to the above-described main ingredient may also be used as the material of the dielectric layer 13.

Examples of a material of each of the plurality of conductive layers 14 may include metals, such as nickel, copper, silver, palladium, and gold, and alloys including at least one of these metals. One example of the alloys may be an alloy of silver and palladium.

Each of the two outer electrodes 12 may include an underlying layer that covers the corresponding end portion of the multilayer body 11 and a plating layer that covers the underlying layer. Examples of a material of the underlying layer may include metals, such as nickel, copper, silver, palladium, and gold, and alloys including at least one of these metals. One example of the alloys may be an alloy of silver and palladium.

The underlying layer may be formed by baking conductive paste applied on both end portion of the fired multilayer body 11 or by firing conductive paste applied on both end portions of the unfired multilayer body 11 simultaneously with the conductive layers 14. The underlying layer may also be formed by plating both end portions of the multilayer body 11 or by curing conductive resin including thermosetting resin applied on both end portions of the multilayer body 11.

Examples of a material of the plating layer may include metals, such as tin, nickel, copper, silver, palladium, and gold, and alloys including at least one of these metals. One example of the alloys may be an alloy of silver and palladium.

The plating layer may include a plurality of layers. In that case, the plating layer may preferably have a two-layer structure in which a tin plating layer is formed on a nickel plating layer. The nickel plating layer defines and functions as a solder barrier layer. The tin plating layer has good wettability with solder.

As illustrated in FIGS. 7 and 8, the board terminal 20 included in the electronic component 100 according to the present preferred embodiment includes a board main body 21 having the electrical insulating properties. In the present preferred embodiment, the board main body 21 preferably has a rectangular or substantially rectangular outer shape in plan view. The outer shape of the board main body 21 is not limited to the rectangular or substantially rectangular shape, and it may be an elliptical or substantially elliptical shape. The board main body 21 may have chamfered corner and ridge portions.

The board main body 21 includes the first principal surface 21a, a second principal surface 21b opposite the first principal surface 21a, and a peripheral surface connecting the first principal surface 21a and the second principal surface 21b. The capacitor element 10 is mounted near the first principal surface 21a, or on the first principal surface 21a side. The peripheral surface of the board main body 21 includes a pair of side surfaces 21c on the opposite sides and a pair of end surfaces 21d connecting the pair of the side surfaces 21c and being on the opposite sides.

As illustrated in FIGS. 1 to 3 and 7, the board terminal 20 includes two mounting electrodes 22 disposed on the first principal surface 21a and electrically coupled to the two outer electrode 12 in the capacitor element 10. Specifically, the two mounting electrodes 22 are spaced apart from each other in the length direction of the board main body 21, the length direction connecting the pair of end surfaces 21d with the shortest distance. Each of the two mounting electrodes 22 preferably has a rectangular or substantially rectangular shape in plan view and is spaced apart from the peripheral surface of the board main body 21. The shortest distance between the two mounting electrodes 22 in the length direction of the board main body 21 is $L_{22}$.

As illustrated in FIGS. 1 to 3 and 8, the board terminal 20 includes two connection electrodes 23 disposed on the second principal surface 21b and electrically coupled to lands (not illustrated) in the circuit board. Specifically, the two connection electrodes 23 are spaced apart from each other in the length direction of the board main body 21. Each of the two connection electrodes 23 preferably has a rectangular or substantially rectangular shape in plan view and is spaced apart from the peripheral surface of the board main body 21. Neither of the two connection electrodes 23 may be disposed on the second principal surface 21b. In that case, as an alternative to the two connection electrodes 23, the two outer electrodes 12 in the capacitor element 10, the two mounting electrodes 22 in the board terminal 20, or two through electrodes 24 (described below) in the board terminal 20 may be electrically coupled to the lands in the circuit board.

The board terminal 20 includes the two through electrodes 24. Each of the through electrodes 24 electrically couples the mounting electrode 22 and the connection electrode 23. Each of the two mounting electrodes 22, the two connection electrodes 23, and the two through electrodes 24 is made of a conductive material, such as copper.

Examples of a material of the board main body 21 may include a resin material, such as epoxy resin, and a ceramic material, such as aluminum oxide. The material of the board main body 21 may contain a filler or fabric made of an inorganic material or organic material. In the present preferred embodiment, the board main body 21 is made of epoxy resin to which glass fabric is added.

As illustrated in FIGS. 1 to 3, in the electronic component 100, the two outer electrodes 12 in the capacitor element 10 are electrically coupled to the two mounting electrodes 22 in the board terminal 20, respectively, with a conductive film 30. In the present preferred embodiment, the conductive film 30 is made of solder. The conductive film 30 is not limited to the solder, and it may be conductive adhesive.

As illustrated in FIG. 1, the dimension of the height of the board main body 21 in a direction perpendicular or substantially perpendicular to the first principal surface 21a in the board terminal 20 is $T_{21}$. As illustrated in FIG. 2, the dimension of the length of the board terminal 20 in the length direction L of the capacitor element 10 is a dimension $L_{21}$ of the length of the board main body 21.

As illustrated in FIGS. 2 and 3, the dimension of the width of the board terminal 20 in a direction that is perpendicular or substantially perpendicular to the direction connecting the two outer electrodes 12 with the shortest distance (to a direction parallel or substantially parallel to the length direction L of the capacitor element 10) and that extends along the first principal surface 21a (that is substantially parallel to the width direction W of the capacitor element 10) is a dimension $W_{21}$ of the width of the board main body 21. The dimension of the width of each of the two mounting electrodes 22 in the direction parallel or substantially parallel to the width direction W of the capacitor element 10 is $W_{22}$.

As illustrated in FIGS. 1 to 3, the dimension of the length of the capacitor element 10 in the length direction L of the capacitor element 10 is $L_{10}$. The dimension of the width of the capacitor element 10 in the direction that is perpendicular or substantially perpendicular to the direction connecting the two outer electrodes 12 with the shortest distance (to the direction parallel or substantially parallel to the length direction L of the capacitor element 10) and that extends along the first principal surface 21a (that is parallel or substantially parallel to the width direction W of the capacitor element 10) is $W_{10}$. The dimension of the height of the capacitor element 10 in the height direction T of the capacitor element 10 is $T_{10}$.

The dimension $T_{10}$ of the height of the capacitor element 10 is smaller than the dimension $W_{10}$ of the width of the capacitor element 10. As described below, the dimension $T_{10}$ of the height of the capacitor element 10 may preferably be not greater than about 80% of the dimension $W_{10}$ of the width of the capacitor element 10, for example.

In the present preferred embodiment, the dimension $W_{21}$ of the width of the board terminal 20 is smaller than the dimension $W_{10}$ of the width of the capacitor element 10. The dimension $L_{21}$ of the length of the board terminal 20 is smaller than the dimension $L_{10}$ of the length of the capacitor element 10. Accordingly, as illustrated in FIG. 2, the two outer electrodes are partially situated outside the outer edge of the board terminal 20 when viewed from the side of the first principal surface 21a, or the first principal surface side, in the board terminal 20.

In the present preferred embodiment, the two outer electrodes 12 are partially situated outside the outer edge of the board terminal 20 in both end portions of the board terminal 20 in the length direction L of the capacitor element 10 and in both end portions of the board terminal 20 in the width direction W of the capacitor element 10.

The dimension of the height from an end of each of the two outer electrodes 12, the end being opposite the board terminal 20, to an end of the board terminal 20, the end being opposite the capacitor element 10, in the direction perpendicular or substantially perpendicular to the first principal surface 21a of the board terminal 20 is $T_0$. In the present preferred embodiment, the dimension $T_0$ of the height from the upper end of each of the two outer electrodes 12 to the lower end of each of the two connection electrodes 23 is the dimension of the height of the electronic component 100.

The dimension $T_0$ of the height from the end of each of the two outer electrodes 12 opposite the board terminal 20 to the end of the board terminal 20 opposite the capacitor element 10 in the direction perpendicular or substantially perpendicular to the first principal surface 21a of the board terminal 20 (dimension of the height of the electronic component 100) is not greater than a larger one (dimension of the width of the electronic component 100) of the dimension $W_{10}$ of the width of the capacitor element 10 and the dimension $W_{21}$ of the width of the board terminal 20 in the direction that is perpendicular or substantially perpendicular to the direction connecting the two outer electrodes 12 with the shortest distance (to the direction parallel or substantially parallel to the length direction L of the capacitor element 10) and that extends along the first principal surface 21a of the board terminal 20 (that is parallel or substantially parallel to the width direction W of the capacitor element 10).

In the present preferred embodiment, as described above, because the dimension $W_{21}$ of the width of the board terminal 20 is smaller than the dimension $W_{10}$ of the width of the capacitor element 10, the dimension $T_0$ of the height of the electronic component 100 is not greater than the dimension $W_{10}$ of the width of the capacitor element 10. To both increase the mounting density and stabilize the mounting position, the dimension $W_{21}$ of the width of the board terminal 20 may preferably be between about 0.03 mm and about 0.06 mm smaller than the dimension $W_{10}$ of the width of the capacitor element 10, for example.

In the present preferred embodiment, as illustrated in FIG. 2, the dimension $L_{21}$ of the length of the board terminal 20 is larger than the dimension $L_{11e}$ of the length of the effective portion 11e in the multilayer body 11. The dimension $W_{21}$ of the width of the board terminal 20 is larger than the dimension $W_{11e}$ of the width of the effective portion 11e in the multilayer body 11. To both increase the mounting density and stabilize the mounting position, the dimension $L_{21}$ of the length of the board terminal 20 may preferably be between about 0.04 mm and about 0.08 mm larger than the dimension $L_{11e}$ of the length of the effective portion 11e in the multilayer body 11, and the dimension $W_{21}$ of the width of the board terminal 20 may preferably be between about 0.04 mm and about 0.08 mm larger than the dimension $W_{11e}$ of the width of the effective portion 11e in the multilayer body 11, for example.

The effective portion 11e in the multilayer body 11 fully overlaps the board terminal 20 when viewed in the direction perpendicular or substantially perpendicular to the board terminal 20. The two mounting electrodes 22 fully overlap the effective portion 11e in the multilayer body 11 when viewed in the direction perpendicular or substantially perpendicular to the first principal surface 21a of the board terminal 20.

As illustrated in FIGS. 1, 5, and 6, the dimension $T_{21}$ of the height of the board main body 21 is larger than the dimension $T_a$ of the height of the ineffective portion 11n in the portion between the second principal surface 112, which faces the board terminal 20, and the effective portion 11e in the multilayer body 11 in the direction perpendicular or substantially perpendicular to the first principal surface 21a of the board terminal 20.

As illustrated in FIG. 2, the shortest distance $L_{22}$ between the two mounting electrodes 22 is smaller than the shortest distance $L_{12}$ between the two outer electrodes 12.

As described above, the dimension $T_0$ of the height of the electronic component 100 according to the present preferred embodiment is not greater than the dimension $W_{10}$ of the width of the electronic component 100. Therefore, the position of the electronic component 100 in mounting the electronic component 100 on the circuit board is stabilized.

In mounting the electronic component 100 on the circuit board, solder joining the two connection electrodes 23 in the board terminal 20 and the lands in the circuit board may spread upward, reach the capacitor element 10, and form solder fillet on the peripheral surface of the capacitor element 10. In that case, vibrations propagate from the capacitor element 10 through the fillet to the circuit board, and this is unfavorable.

In the electronic component 100 according to the present preferred embodiment, the two outer electrodes 12 are partially situated outside the outer edge of the board terminal 20 when viewed from the side of the first principal surface 21a, or the first principal surface side, in the board terminal 20.

Therefore, if the solder joining the two connection electrodes 23 in the electronic component 100 and the lands in the circuit board spreads upward in mounting the electronic component 100 on the circuit board, after the solder comes into contact with the outer electrodes 12 in the portion near the second principal surface 112 in the capacitor element 10, the solder can spread upward on the outer electrodes 12 in the portion on the peripheral surface of the capacitor element 10. Consequently, the height of the solder fillet provided on the peripheral surface of the capacitor element 10 is significantly reduced. The reduction in the height of the solder fillet leads to a reduction in the size of the propagation path for the vibrations from the capacitor element 10 to the circuit board, and thus acoustic noise is significantly reduced or prevented. This also significantly reduces or prevents expansion of the solder fillet and thus leads to preventing an increase in the size of the mounting space in the electronic component 100, and the mounting density is significantly increased.

Accordingly, the electronic component 100 according to the present preferred embodiment is able to be mounted in a stable position while significantly reducing or preventing acoustic noise.

The inventors of preferred embodiments of the present invention discovered that the effect of reducing acoustic noise produced by the board main body 21 in the board terminal 20 was larger than the effect of reducing acoustic noise produced by the ineffective portion 11n in the portion between the second principal surface 112 and the effective portion 11e in the multilayer body 11. This discovery is also illustrated in an example described above.

In the electronic component 100 according to the present preferred embodiment, the dimension $T_{21}$ of the height of the board main body 21 is larger than the dimension $T_a$ of the height of the ineffective portion 11n in the portion between the second principal surface 112, which faces the board terminal 20, and the effective portion 11e in the multilayer body 11. This effectively reduces acoustic noise and prevents an increase in the height of the electronic component 100.

In the electronic component 100 according to the present preferred embodiment, the two mounting electrodes 22 fully overlap the effective portion 11e in the multilayer body 11 when viewed in the direction perpendicular or substantially perpendicular to the first principal surface 21a of the board terminal 20. This leads to preventing spreading of the solder joining the two mounting electrodes 22 in the board terminal 20 and the two outer electrodes 12 in the capacitor element 10 upward on the outer electrodes 12 in the portion on the peripheral surface of the capacitor element 10.

The vibrations created by the capacitor element 10 diminish while propagating in the board terminal 20. Because the two mounting electrodes 22 fully overlap the effective portion 11e in the multilayer body 11, most of the vibrations created by the capacitor element 10 propagate to the board terminal 20 and diminish, and this results in reduced audible noise (acoustic noise) produced by propagation of the vibrations to the circuit board.

In the electronic component 100 according to the present preferred embodiment, the shortest distance $L_{22}$ between the two mounting electrodes 22 is smaller than the shortest distance $L_{12}$ between the two outer electrodes 12. This leads to drawing the solder joining the two mounting electrodes 22 in the board terminal 20 and the two outer electrodes 12 in the capacitor element 10 toward the central side in the length direction of the board terminal 20, as illustrated in FIG. 1, and thus leads to preventing spreading of this soldering upward on the outer electrodes 12 in the portions on the first end surface 113 and the second end surface 114.

In the electronic component 100 according to the present preferred embodiment, the two mounting electrodes 22 are spaced apart from the peripheral surface of the board main body 21 in plan view. This leads to preventing joining of the solder joining the two mounting electrodes 22 in the board terminal 20 and the two outer electrodes 12 in the capacitor element 10 and the solder joining the two connection electrodes 23 in the board terminal 20 and the lands in the circuit board. Consequently, the vibrations created by the capacitor element 10 are able to propagate to the board terminal 20 and diminish, and this results in reduced audible noise (acoustic noise) produced by propagation of the vibrations to the circuit board.

In the electronic component 100 according to the present preferred embodiment, the dimension $L_{21}$ of the length of the board terminal 20 is larger than the dimension $L_{11e}$ of the length of the effective portion 11e in the multilayer body 11. The dimension $W_{21}$ of the width of the board terminal 20 is larger than the dimension $W_{11e}$ of the width of the effective portion 11e in the multilayer body 11. The effective portion 11e in the multilayer body 11 fully overlaps the board terminal 20 when viewed in the direction perpendicular or substantially perpendicular to the first principal surface 21a in the board terminal 20.

Therefore, most of the vibrations created by the capacitor element 10 can propagate to the board terminal 20 and diminish, and this results in reduced audible noise (acoustic noise) produced by propagation of the vibrations to the circuit board.

In the electronic component 100 according to the present preferred embodiment, the dimension $T_{10}$ of the height of the capacitor element 10 is smaller than the dimension $W_{10}$ of the width of the capacitor element 10. The dimension $T_{10}$ of the height of the capacitor element 10 may preferably be not larger than about 80% of the dimension $W_{10}$ of the width of the capacitor element 10, for example.

This enables the principal surfaces and the side surfaces of the capacitor element 10 to be easily distinguished from each other by the appearance of the capacitor element 10. Consequently, the capacitor element 10 is easily oriented during mounting of the capacitor element 10 on the board terminal 20. In the present preferred embodiment, the capacitor element 10 is easily oriented such that the second principal surface 112 faces the first principal surface 21a in the board terminal 20.

As illustrated in FIG. 3, each of a pair of side surfaces 22c of each of the two mounting electrodes 22 is at least partially covered with the conductive film 30. When each of the pair of side surfaces 22c of each of the two mounting electrodes 22 is at least partially covered with the conductive film 30 during mounting of the capacitor element 10 on the board terminal 20, misregistration of the capacitor element 10 with respect to the board terminal 20 is significantly reduced or prevented by the self-alignment effect. Consequently, variations in mounting locations of the electronic components 100 on the circuit board are significantly reduced or prevented. To cover at least partially each of the pair of side surfaces 22c of each of the mounting electrodes 22 with the conductive film 30, the size of the conductive film 30 applied on the mounting electrode 22 may be larger than the size of the upper surface of the mounting electrode 22.

In the present preferred embodiment, the dimension $W_{21}$ of the width of the board main body 21 is smaller than the dimension $W_{10}$ of the width of the capacitor element 10. To prevent electrical shorting between the electronic component 100 and its neighboring electronic component mounted on the circuit board, the dimension $W_{21}$ of the width of the board main body 21 may be larger than the dimension $W_{10}$ of the width of the capacitor element 10. In other words, the capacitor element 10 may be situated between the pair of side surfaces 21c of the board main body 21 when viewed in the direction perpendicular or substantially perpendicular to the first principal surface 21a of the board main body 21. In this configuration, if the electronic component 100 mounted on the circuit board is displaced and comes into contact with its neighboring electronic component, because the board main body 21 having the electrical insulating properties comes into contact with its neighboring electronic component, the capacitor element 10 is prevented from coming into contact with its neighboring electronic component. Thus, electrical shorting between the neighboring electronic components on the circuit board is prevented.

An electronic component according to a variation of the present preferred embodiment is described below with reference to the drawings. A main difference between the electronic component according to the variation of the present preferred embodiment and that according to the present preferred embodiment is the lamination direction of the conductive layers in the capacitor element. The description of the other configuration is not repeated here.

Figure 9:
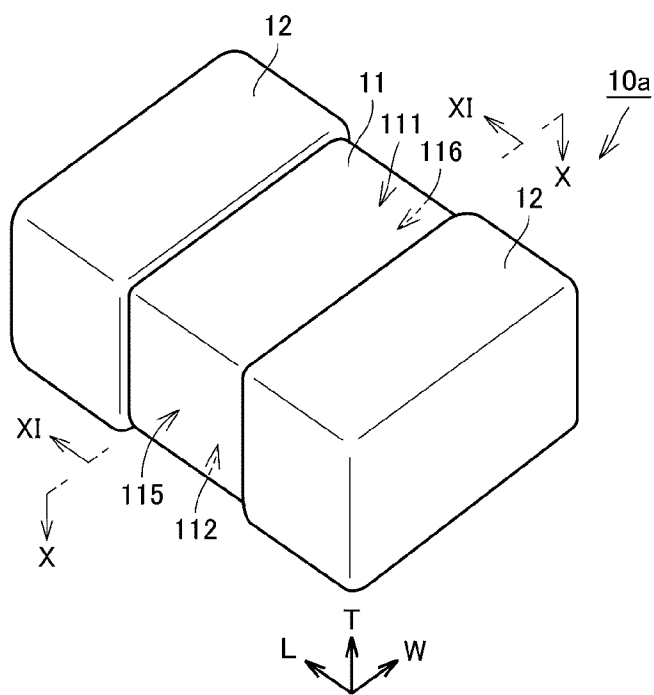
FIG. 9 is a perspective view that illustrates an outward appearance of a capacitor element included in an electronic component according to a variation of the first preferred embodiment of the present invention.
Figure 10:
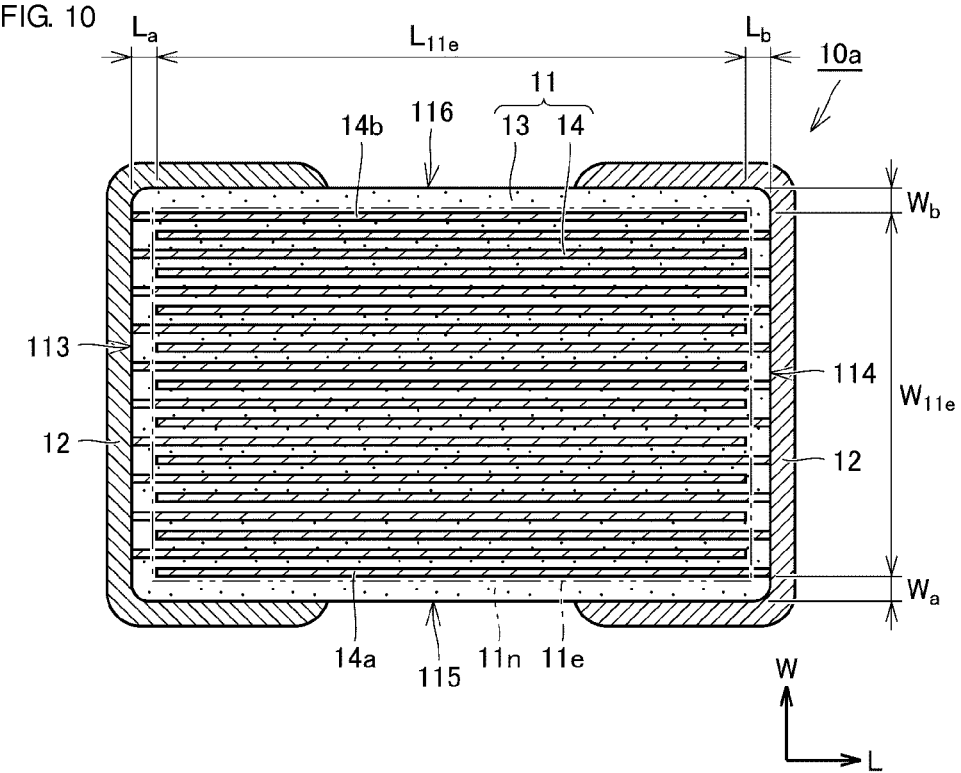
FIG. 10 is a cross-sectional view of the capacitor element illustrated in FIG. 9 viewed from the direction of the line X-X with the arrows.
Figure 11:
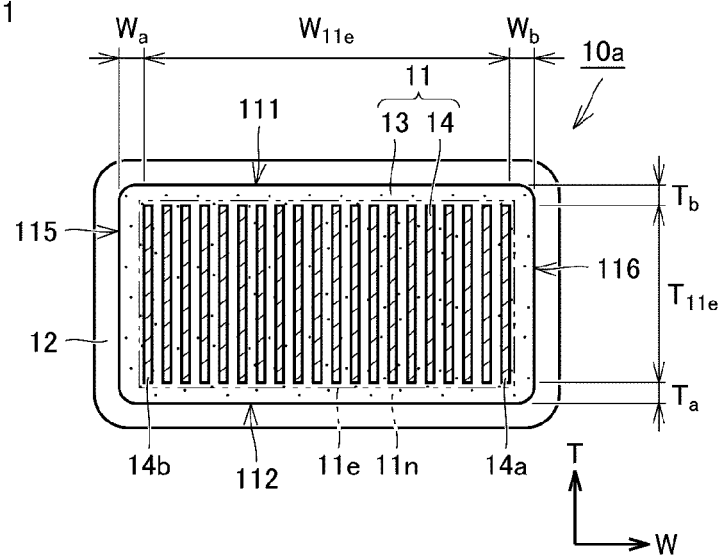
FIG. 11 is a cross-sectional view of the capacitor element illustrated in FIG. 9 viewed from the direction of the line XI-XI with the arrows.

FIG. 9 is a perspective view that illustrates an outward appearance of the capacitor element included in the electronic component according to the variation of the present preferred embodiment. FIG. 10 is a cross-sectional view of the capacitor element illustrated in FIG. 9 viewed from the direction of the line X-X with the arrows. FIG. 11 is a cross-sectional view of the capacitor element illustrated in FIG. 9 viewed from the direction of the line XI-XI with the arrows.

As illustrated in FIGS. 9 to 11, in a capacitor element 10a according to the variation of the present preferred embodiment, the direction in which the dielectric layers 13 and the conductive layers 14 are laminated is perpendicular or substantially perpendicular to the length direction L of the capacitor element 10a and the height direction T of the capacitor element 10a. That is, the lamination direction of the dielectric layers 13 and the conductive layers 14 is parallel or substantially parallel to the width direction W of the capacitor element 10a.

In the variation of the present preferred embodiment, the effective portion 11e in the multilayer body 11 is an overlapping area of all of the plurality of conductive layers 14, which include the first conductive layer 14a nearest the first side surface 115, the second conductive layer 14b nearest the second side surface 116, and conductive layers 14 disposed therebetween, when viewed in the width direction W of the capacitor element 10a.

The electronic component according to the variation of the present preferred embodiment is also able to be mounted in a stable position while significantly reducing or preventing acoustic noise, as in the electronic component 100 according to the present preferred embodiment.

An electronic component according to a second preferred embodiment of the present invention is described below with reference to the drawings. An electronic component 100a according to the second preferred embodiment of the present invention differs from the electronic component 100 according to the first preferred embodiment only in that the board main body in the board terminal 20 includes indentations. The description of the other configuration is not repeated here.

Second Preferred Embodiment

Figure 12:
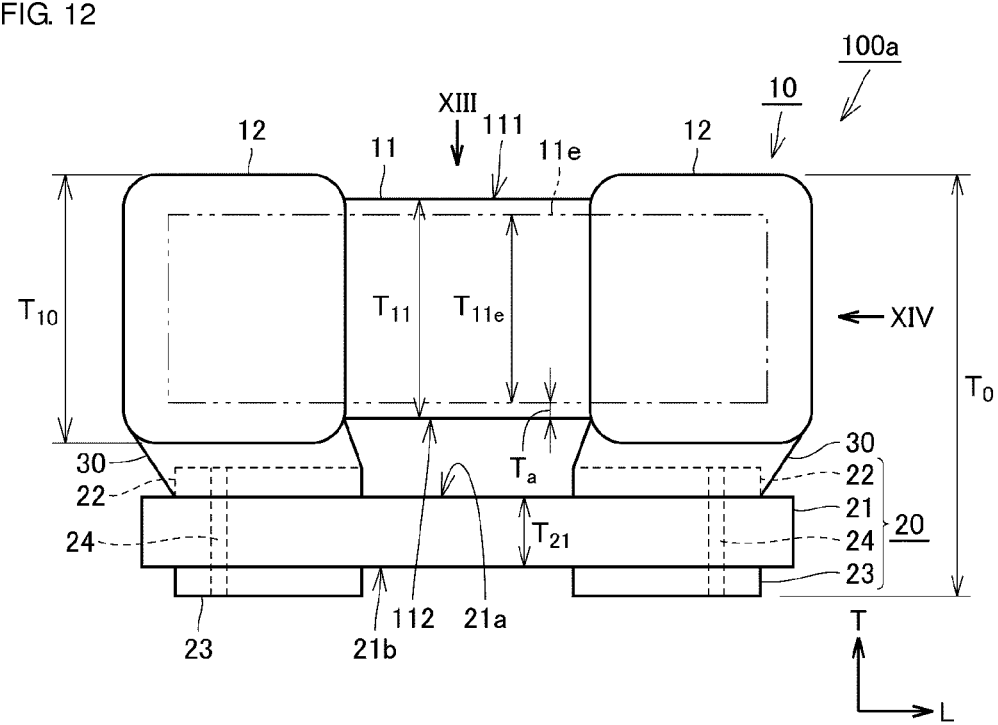
FIG. 12 is a front view that illustrates a configuration of an electronic component according to a second preferred embodiment of the present invention.
Figure 13:
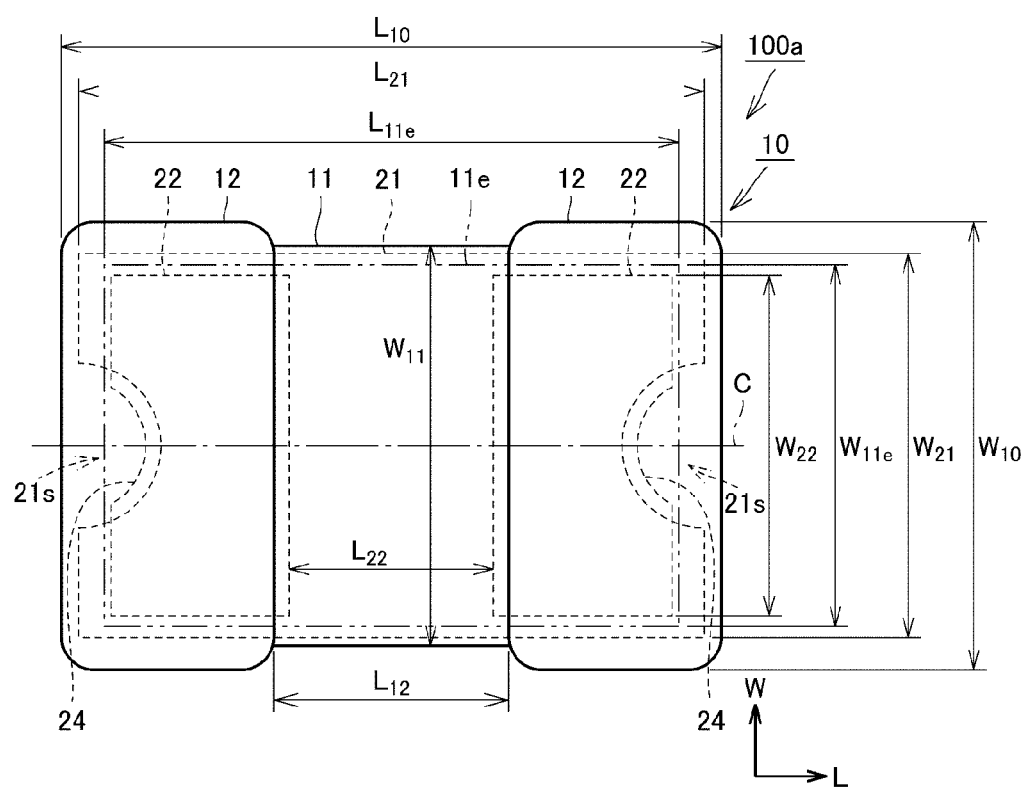
FIG. 13 is a plan view of the electronic component illustrated in FIG. 12 viewed from the direction of the arrow XIII.
Figure 14:
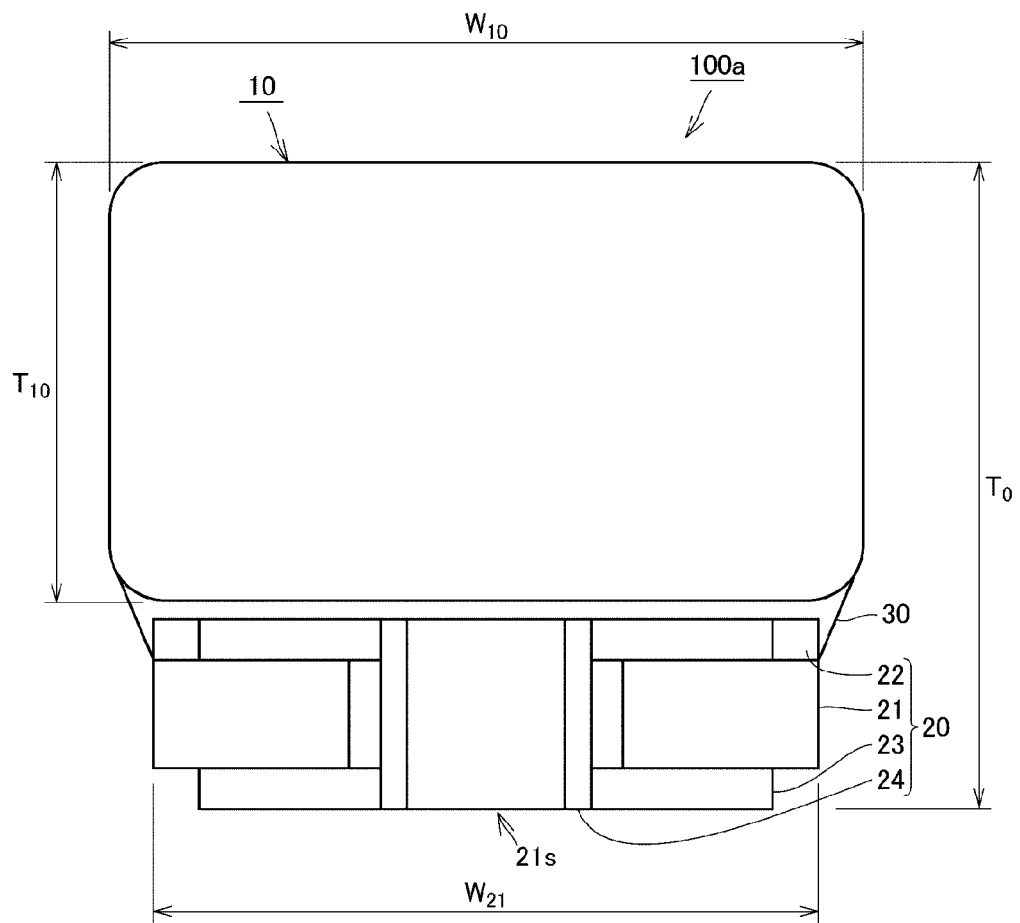
FIG. 14 is a side view of the electronic component illustrated in FIG. 12 viewed from the direction of the arrow XIV.

FIG. 12 is a front view that illustrates a configuration of the electronic component according to the second preferred embodiment of the present invention. FIG. 13 is a plan view of the electronic component illustrated in FIG. 12 viewed from the direction of the arrow XIII. FIG. 14 is a side view of the electronic component illustrated in FIG. 12 viewed from the direction of the arrow XIV.

As illustrated in FIGS. 12 to 14, the board terminal 20 included in the electronic component 100a according to the second preferred embodiment of the present invention includes indentations 21s on both ends in the length direction of the board main body 21. Each of the indentations 21s preferably has a semielliptical shape in plan view. The shape of the indentation 21s in plan view is not limited to the semiellipse and may be a polygon. In the present preferred embodiment, the through electrodes 24 are disposed on walls defining the indentations 21s.

The indentations 21s allow the solder joining the electronic component 100a and the lands in the circuit board to be stored in space defined by the indentation 21s.

Therefore, if the solder joining the two connection electrodes 23 in the electronic component 100a and the lands in the circuit board spreads upward in mounting the electronic component 100a on the circuit board, after the solder comes into contact with the outer electrodes 12 in the portion near the second principal surface 112 in the capacitor element 10, the solder can spread upward on the outer electrodes 12 in the portion on the peripheral surface of the capacitor element 10. Consequently, the height of the solder fillet provided on the peripheral surface of the capacitor element 10 is significantly reduced. The reduction in the height of the solder fillet leads to a reduction in the size of the propagation path for vibrations from the capacitor element 10 to the circuit board, and acoustic noise is significantly reduced or prevented. This also prevents expansion of the solder fillet and leads to preventing an increase in the size of the mounting space in the electronic component 100a.

The electronic component 100a according to the present preferred embodiment is also able to be mounted in a stable position while significantly reducing or preventing acoustic noise. The electronic component 100a according to the present preferred embodiment may include the capacitor element 10a according to the variation of the first preferred embodiment.

Below is the description of an example of comparison between the effect of reducing acoustic noise produced by the ineffective portion in the portion between the second principal surface and the effective portion in the multilayer body in the capacitor element and the effect of reducing acoustic noise produced by the board main body in the board terminal.

EXAMPLE

Figure 15:
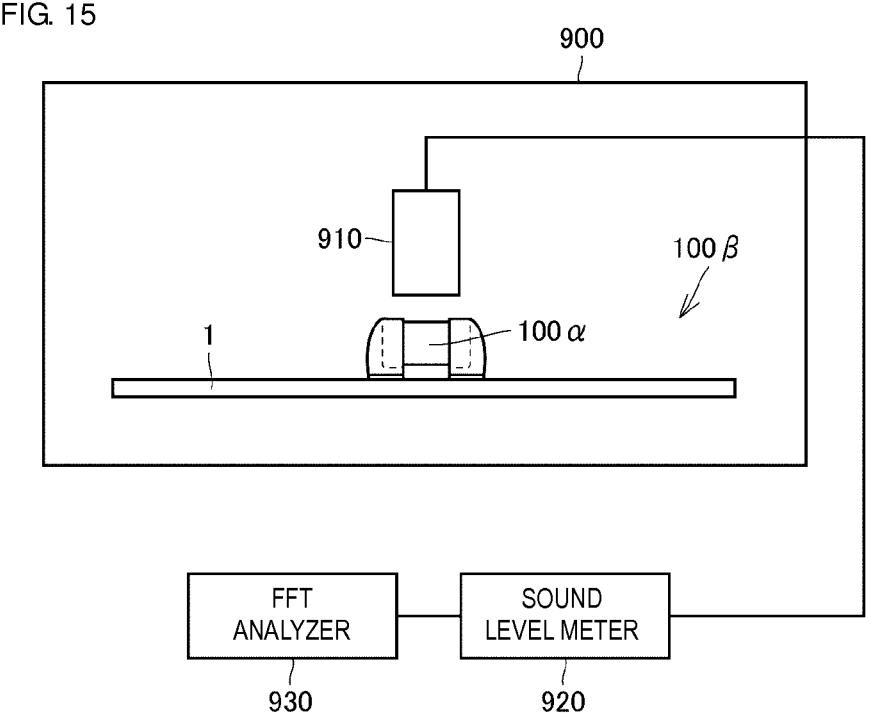
FIG. 15 is a schematic view that illustrates how a sound pressure of noise is measured in an example.

First, how a sound pressure of noise emitted from a circuit board on which an electronic component is mounted was measured in an example below is described. FIG. 15 is a schematic view that illustrates how a sound pressure of noise was measured in the example.

As illustrated in FIG. 15, to actually measure a sound pressure of noise, an electronic component mounting structure 100β was placed in an anechoic box 900. In this state, a direct-current voltage of about 3.7 V and an alternating-current voltage of about 1.0 Vpp in a frequency band of about 1.5 kHz to about 20 kHz were applied to a capacitor element in an electronic component 100α mounted on a circuit board 1, and a total sound pressure level of noise occurring during the application was measured.

The total sound pressure level of noise was measured by collecting sound from the electronic component mounting structure 100β with a sound collecting microphone 910 and a sound level meter 920 and analyzing the collected sound by using a Fast Fourier Transform (FFT) analyzer 930 (CF-5220 produced by Ono Sokki Co., Ltd.). The sound collecting microphone 910 was arranged about 3 mm above the capacitor element included in the electronic component mounting structure 100β inside the anechoic box 900 so as to be opposed thereto.

Analytical values of sound pressures of noise for the electronic component mounting structures according to comparative examples and an example implementation of a preferred embodiment of the present invention described below indicate differences from an analytical value of a sound pressure of noise for an electronic component mounting structure according to a first comparative example described below.

In the present example, three kinds of electronic component mounting structures in the first and second comparative examples and a first implementation of a preferred embodiment of the present invention were produced. First, common conditions (design values) of the three kinds of electronic component mounting structures are described.

The dimension of the width of the multilayer body in the width direction W of the capacitor element was about 0.63 mm. The dimension of the length of the multilayer body in the length direction L of the capacitor element, the outer dimensions of the effective portion, and the lamination direction of the conductive layers were substantially the same in the three kinds of electronic component mounting structures in the first and second comparative examples and first implementation. The lamination direction of the conductive layers was parallel or substantially parallel to the height direction of the capacitor element.

The electronic component mounting structure according to each of the first and second comparative examples does not include a board terminal. That is, the capacitor element is directly mounted on the circuit board 1.

The configuration of the capacitor element included in the electronic component mounting structure according to the first comparative example and that according to the first implementation are substantially the same. In the capacitor element in the electronic component mounting structure according to each of the first comparative example and the first implementation, the dimension of the height of the multilayer body in the height direction T of the capacitor element was about 0.327 mm, and the dimension of the height of the ineffective portion in the portion between the principal surface near the circuit board and the effective portion in the multilayer body was about 0.032 mm.

In the capacitor element in the electronic component mounting structure according to the second comparative example, the dimension of the height of the multilayer body in the height direction T of the capacitor element was about 0.653 mm, and the dimension of the height of the ineffective portion in the portion between the principal surface near the circuit board and the effective portion in the multilayer body was about 0.334 mm.

In the board terminal in the electronic component mounting structure according to the first implementation, the dimension of the height of the board main body was about 0.15 mm, the dimension of the height of the mounting electrode was about 0.035 mm, and the dimension of the height of the connection electrode was about 0.035 mm.

The sound pressure of noise emitted from the electronic component mounting structure in the second comparative example and that in the first implementation with respect to that in the first comparative example was about −12 dB and about −29 dB, respectively. Although the dimension of the height of the electronic component in the electronic component mounting structure according to the first implementation is smaller than that according to the second comparative example, the sound pressure of noise emitted from the electronic component mounting structure according to the first implementation is smaller than that according to the second comparative example.

The above result illustrates that the effect of reducing acoustic noise produced by the board main body in the board terminal was larger than the effect of reducing acoustic noise produced by the ineffective portion in the portion between the second principal surface and the effective portion in the multilayer body.

One example method for measuring the dimensions may be magnifying a ground cross section of the electronic component by about 10 times and observing it by an optical microscope and measuring a dimension on a straight line passing through substantially the center of the ground cross section. If it is difficult to clearly measure the dimension by using the optical microscope, a scanning electron microscope may be used as an alternative to the optical microscope in observing the ground cross section.

For example, to measure the dimension $T_a$ of the height of the ineffective portion 11n in the portion between the second principal surface 112 and the effective portion 11e in the multilayer body 11, a straight line $L_c$ extending along the lamination direction in the multilayer body 11 and passing through substantially the center of the multilayer body 11 is drawn in a magnified image obtained by observing a cross section of the capacitor element 10 by an optical microscope, and the dimension $T_a$ of the height of the ineffective portion 11n on the straight line $L_c$ is measured. Subsequently, to measure the dimension $T_{21}$ of the height of the board main body 21 in the board terminal 20, the dimension $T_{21}$ of the height of the board main body 21 on the straight line $L_c$ is measured.

The effective portion 11e in the multilayer body 11 can be recognized by observing a ground cross section by an optical microscope in substantially the same way as described above. The effective portion 11e in the multilayer body 11 may also be recognized by observing a transmissive image captured by emitting X rays from the first principal surface 111 side or second principal surface 112 side to the electronic component 100. The width of the effective portion 11e in the multilayer body 11 is the width from an end of the outermost conductive layer 14 on one side in the width direction of the multilayer body 11 to another end of the outermost conductive layer 14 on another side in the width direction of the multilayer body 11.

It is to be understood that the disclosed preferred embodiments are illustrative in all respects and are not restrictive. The scope of the present invention is not indicated in the above description, but is indicated in claims, and it is intended to include all changes within the meaning and scope equivalent to claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   an electronic element including two outer electrodes on a surface thereof;
   a board terminal including a board main body and two mounting electrodes, the board main body having electrical insulating properties and including a first principal surface, the two mounting electrodes being disposed on the first principal surface, being spaced apart from each other in a length direction, and electrically coupled to the two outer electrodes, respectively, the electronic element being mounted on the first principal surface; wherein
   the two outer electrodes are partially disposed outside an outer edge of the board terminal when viewed from a height direction of the electronic element; and a dimension in the height direction of the electronic element is not greater than a larger one of a dimension in a width direction of the electronic element and a dimension in the width direction of the board terminal, the height direction is perpendicular or substantially perpendicular to the first principal surface, the width direction is perpendicular or substantially perpendicular to the length direction and the height direction.

2. The electronic component according to claim 1, wherein
the electronic element further includes a multilayer body in which a plurality of dielectric layers and a plurality of conductive layers are laminated;
the plurality of conductive layers includes first inner electrodes connecting one of the two outer electrodes and second inner electrodes connecting the other one of the two outer electrodes;
the multilayer body includes an effective portion in which the first inner electrodes and the second inner electrodes overlap one another with the dielectric layer disposed therebetween, and an ineffective portion surrounding the effective portion; and
a dimension in the height direction of the board main body is larger than a dimension in the height direction of a portion of the ineffective portion between the board terminal and the effective portion.

3. The electronic component according to claim 2, wherein the two mounting electrodes fully overlap the effective portion when viewed from the height direction.

4. The electronic component according to claim 3, wherein a shortest distance between the two mounting electrodes is not greater than the shortest distance between the two outer electrodes.

5. The electronic component according to claim 1, wherein the dimension in the width direction of the board terminal is smaller than the dimension in the width direction of the electronic element.

6. The electronic component according to claim 1, wherein a dimension in the length direction of the board terminal is smaller than a dimension in the length direction of the electronic element.

7. The electronic component according to claim 1, wherein a dimension in the height direction of the electronic element is smaller than the dimension in the width direction of the electronic element.

8. The electronic component according to claim 1, wherein each of a pair of side surfaces in each of the two mounting electrodes is at least partially covered with a conductive film joining the two outer electrodes and the two mounting electrodes.

9. The electronic component according to claim 1, wherein the electronic element is a capacitor element.

10. The electronic component according to claim 9, wherein the capacitor element includes two outer electrodes.

11. The electronic component according to claim 10, wherein the effective portion includes conductive layers overlapping dielectric layers such that a first one of the conductive layers connected to one of the two outer electrodes and a second one of the conductive layers connected to the other of the two outer electrodes are laminated with one of the dielectric layers disposed therebetween.

12. The electronic component according to claim 10, wherein a direction connecting the two outer electrodes with a shortest distance is parallel or substantially parallel to a length direction of the capacitor element.

13. The electronic component according to claim 10, wherein at least one of the two outer electrodes includes a conductive paste underlying layer and a plating layer that covers the underlying layer.

14. The electronic component according to claim 13, wherein the plating layer includes a plurality of plating layers made of different materials.

15. The electronic component according to claim 9, wherein the capacitor element includes a plurality of dielectric layers and a plurality of conductive layers alternately laminated in a lamination direction.

16. The electronic component according to claim 15, wherein the lamination direction is perpendicular or substantially perpendicular to a length direction of the capacitor element.

17. The electronic component according to claim 9, wherein the capacitor element includes a multilayer body including an effective portion and an ineffective portion.

18. The electronic component according to claim 17, wherein the effective portion defines and functions as a capacitor and the ineffective portion does not define or function as a capacitor.

19. The electronic component according to claim 1, wherein the board terminal includes indentations on both ends in a length direction of the board main body.

20. The electronic component according to claim 1, wherein the indentations have a shape that is one of elliptical, semi-elliptical and polygonal.

* * * * *